Nov. 19, 1935.   K. G. KUTCHKA   2,021,186
APPARATUS FOR MAKING SHEET GLASS
Filed Feb. 16, 1935   3 Sheets-Sheet 3

INVENTOR.
KARL G. KUTCHKA
BY Bradley + Bee
ATTORNEYS.

Patented Nov. 19, 1935

2,021,186

UNITED STATES PATENT OFFICE 2,021,186

APPARATUS FOR MAKING SHEET GLASS

Karl G. Kutchka, Wilkinsburg, Pa., assignor to Pittsburgh Plate Glass Company, a corporation of Pennsylvania Application February 16, 1935, Serial No. 6,850

6 Claims. (Cl. 49—17)

Figure 1:
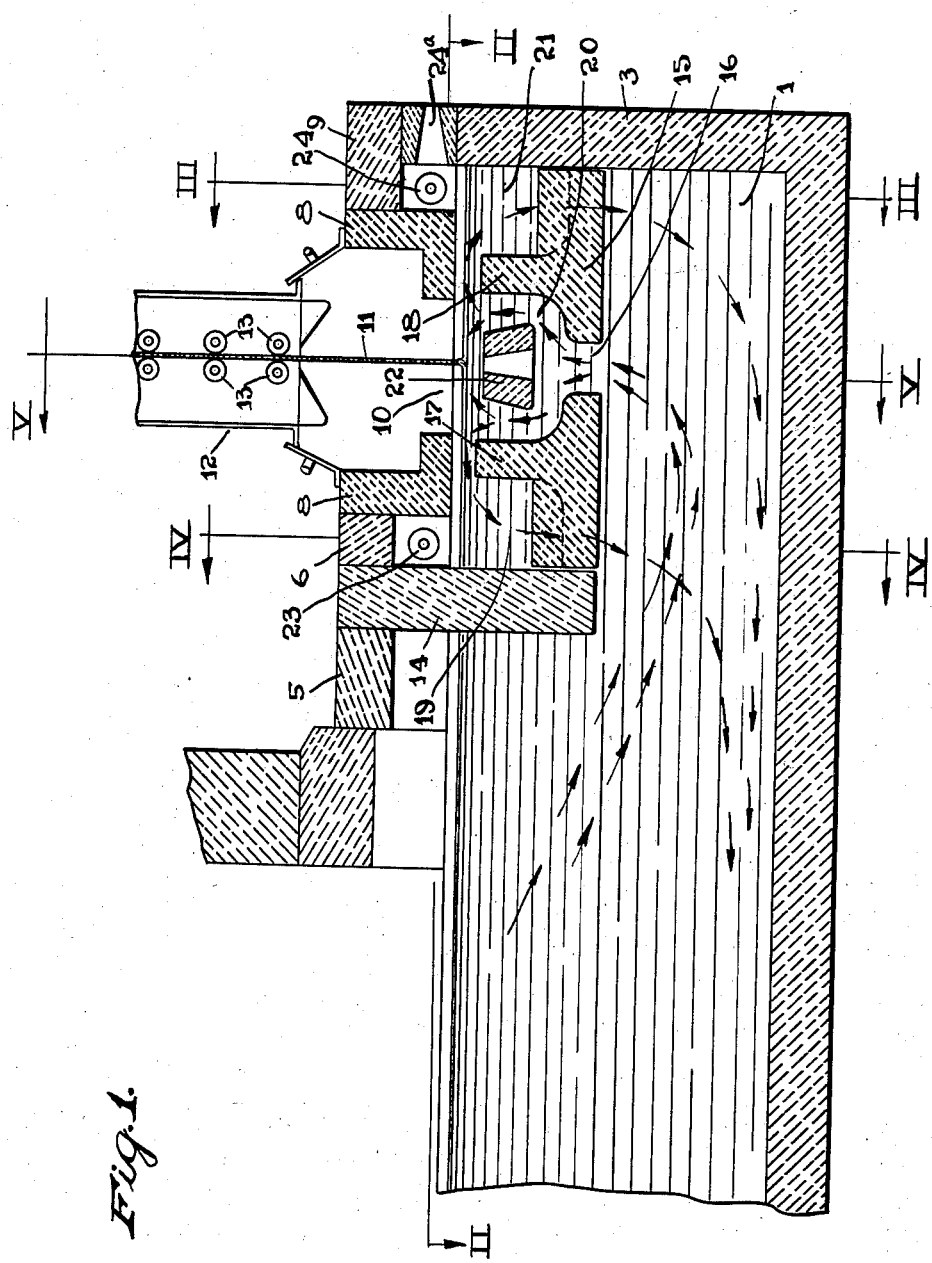
Figure 2:
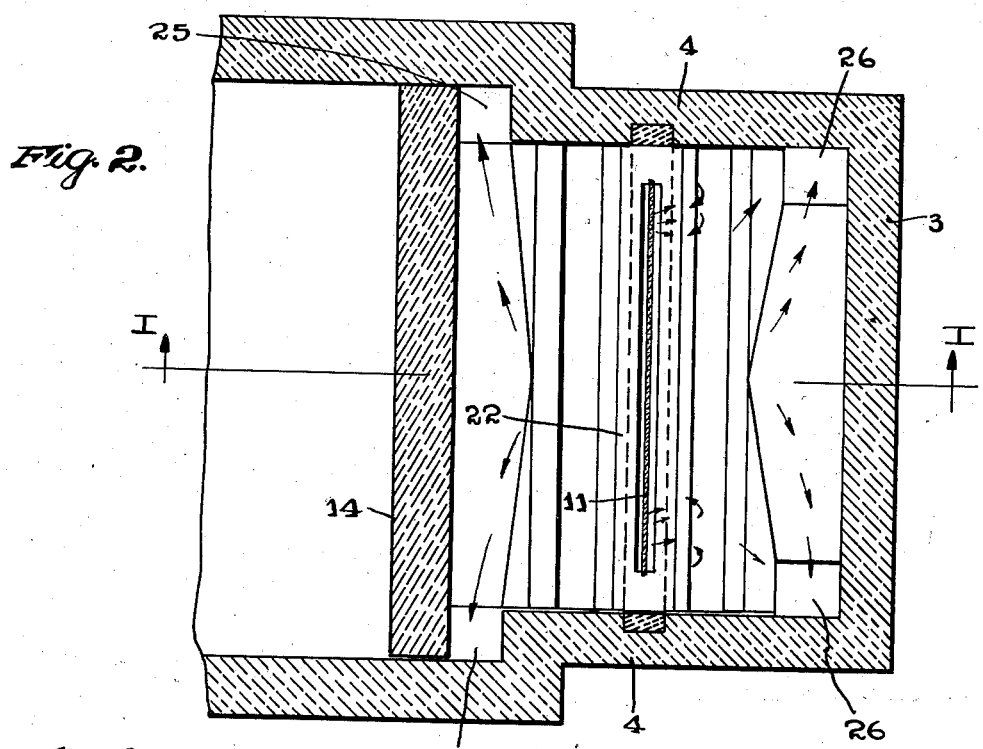
Figure 3:
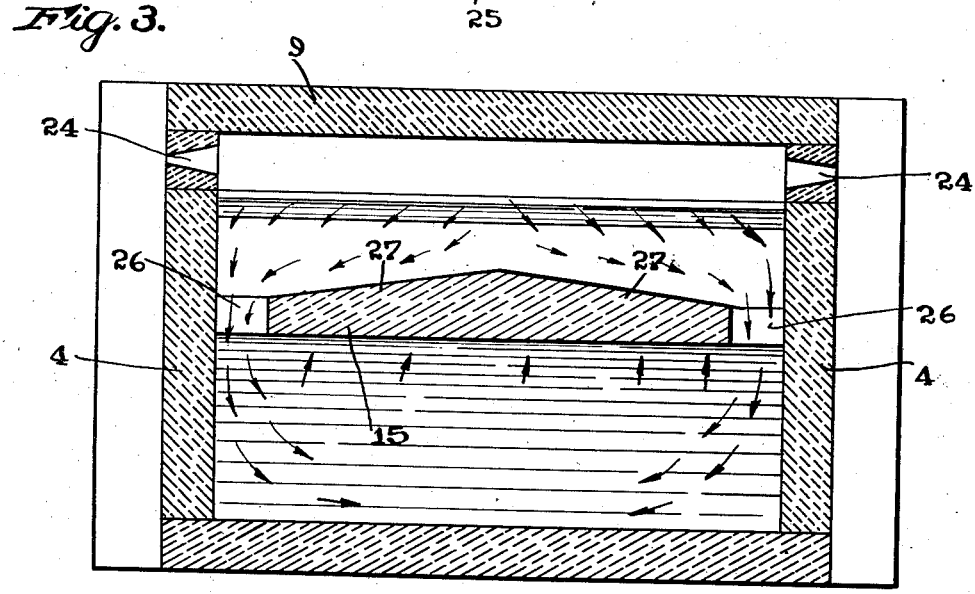

The invention relates to apparatus for making sheet glass and particularly to the construction in the forehearth or kiln from which the sheet is drawn. In apparatus of this kind, difficulty is experienced in maintaining the bath from which the sheet is drawn of the same temperature on both sides of the line of draw, the normal tendency being to run a higher temperature on the side of the line of draw which is nearest the melting tank. This variation in temperature on the two sides of the line of draw tends to cause warping and breakage in the sheet produced, and the present invention has for its principal object the provision of improved clay work (or its equivalent refractory) which will insure the same temperature in the bath on the two sides of the sheet drawn. A further object is to provide an improved arrangement for securing a circulation of the excess glass supplied to the draw pot or receptacle back into the main body of glass in the kiln beneath the receptacle. One embodiment of the invention is illustrated in the accompanying drawings, wherein:

Figure 1 is a vertical section through the tank construction on the line I—I of Fig. 2. Fig. 2 is a horizontal section on the line II—II of Fig. 1. Fig. 3 is a vertical section on the line III—III of Fig. 1. And Figs. 4 and 5 are sections respectively on the lines IV—IV and V—V of Fig. 1.

Referring to the drawings, 1 is a drawing kiln which communicates at its left hand end with a melting tank of the regenerator type. The drawing kiln has the end wall 3, the side walls 4, 4 and a cover consisting of the refractory members 5, 6, 8, 8, and 9, the members 8, 8 each being in the form of an L-block with a drawing opening 10 therebetween, through which the glass sheet 11 is drawn continuously. Any form of drawing apparatus may be employed, the one shown being of the Fourcault type comprising the casing 12 and the pairs of drawing rolls 13, 13 which are driven and apply the necessary traction to the glass sheet.

Extending downward from the cover of the kiln or forehearth to a substantial distance into the body of glass therein is a vertical division wall 14, which extends from one side of the tank to the other. Extending from this vertical division wall 14 to the end wall 3 of the tank is a horizontal division wall 15, such wall extending from one side wall of the kiln to the other, as indicated in Figs. 3 and 4. This division wall is provided with a slot 16 which lies beneath the line of draw of the sheet 11 and serves to supply the glass which goes into the sheet. The division wall is also provided with a pair of flanges 17 and 18 extending from one side wall of the tank to the other and dividing the space above the division wall 15 into three receptacles 19, 20, and 21, the central one of which constitutes the draw pot of the apparatus. Located in this draw pot beneath the line of draw of the sheet 11 is the draw bar 22, whose upper surface lies below the surface of the glass in the pot. The upper edges of the flanges 17 and 18 also lie below the surface of the glass so that in operation any excess glass supplied to the draw pot through the slot 16 which does not go into the formation of the sheet flows over the tops of the flanges and into the receptacles 19 and 21. Burner openings 23, 24, and 24a are provided above the receptacles 19 and 21 to permit of the application of heat so that the body of glass on each side of the sheet 11 may be maintained at the same temperature.

Figure 4:
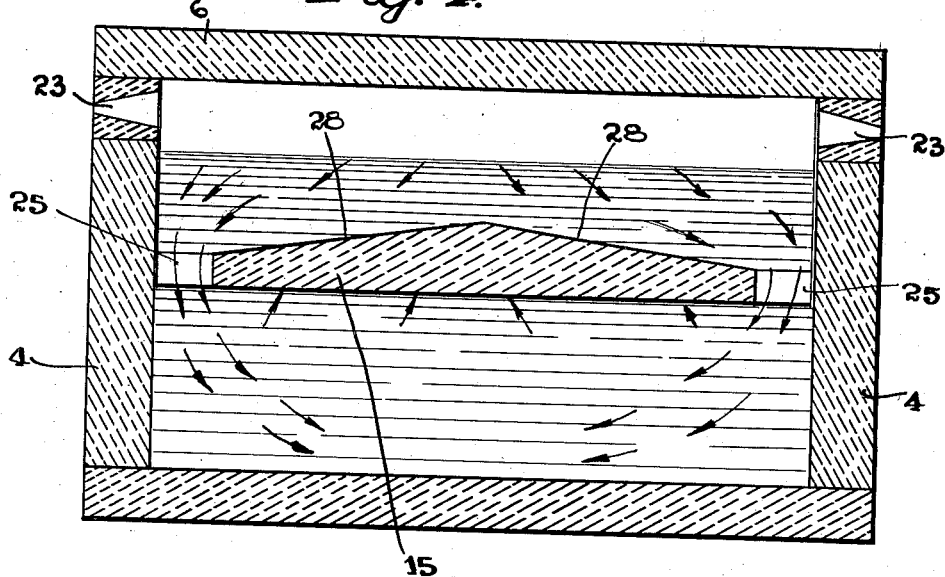
Figure 5:
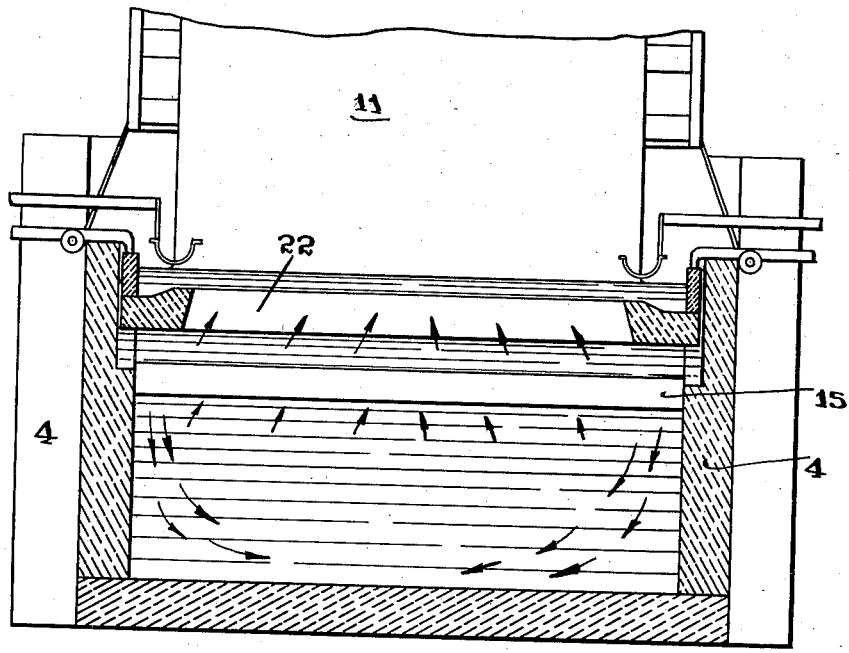

In order to permit of a return of the glass in the receptacles 19 and 21 to the main body of glass in the kiln, the four circulation ports 25, 25 and 26, 26 are provided, such ports being located at the corners of the horizontal division wall 15, as indicated in Figs. 2, 3, and 4. In order to promote the flow of glass in the receptacles to the circulation ports, the bottoms thereof are inclined as indicated at 27 in Fig. 3 and at 28 in Fig. 4.

The arrangement of clay work as above described tends to give a uniform temperature in the body of glass from which the sheet is drawn on each side of the line of draw. The glass which goes into the formation of the sheet flows up through the slot 16 to the surface of the bath from which it is drawn into the sheet. The excess glass flowing into the pot passes over the upper edges of the flanges 17 and 18, as indicated by the arrows, into the receptacles 19 and 21, and as it becomes cooled in these receptacles, flows downward through the circulation ports 25 and 26 to the body of glass beneath the division wall 15, where it tends to circulate back along the bottom of the forehearth and melting tank, as indicated by the arrows in Fig. 1. The burners 23 and 24 come into play in keeping the temperature of the glass in the draw pot at the point best suited for the drawing operation and for equalizing the temperature of the two sides of the line of draw in case some slight departure from uniform temperature should occur. The burners are also used when the drawing operation is discontinued for reconditioning the bath preliminary to initiating a further drawing operation.

What I claim is:

1. In combination in glass drawing apparatus comprising a drawing kiln adapted to carry a body of molten glass and a sheet drawing means above the bath, a cover for the kiln having a transverse drawing opening therethrough, an upright division wall lying transversely of the kiln intermediate its ends, and extending downwardly from the cover to a point below the glass level, a horizontal division wall below the glass level extending from the upright division wall to the rear end wall of the kiln and from one side wall of the kiln to the other and provided with a slot directly below said drawing opening, and a flange projecting upward from the horizontal division wall on each side of the slot to a point below the glass level, and dividing the space above said horizontal division wall into three parallel receptacles extending from one side of the kiln to the other the central one of which constitutes a draw pot with its center between said drawing opening and said slot in vertical alignment therewith.

2. In combination in glass drawing apparatus comprising a drawing kiln adapted to carry a body of molten glass and a sheet drawing means above the bath, a cover for the kiln having a transverse drawing opening therethrough, an upright division wall lying transversely of the kiln intermediate its ends, and extending downwardly from the cover to a point below the glass level, a horizontal division wall below the glass level extending from the upright division wall to the rear end wall of the kiln and from one side wall of the kiln to the other, and provided with a slot directly below said drawing opening, a flange projecting upward from the horizontal division wall on each side of the slot to a point below the glass level, and dividing the space above said horizontal division wall into three parallel receptacles extending from one side of the kiln to the other, the central one of which constitutes a draw pot with its center in vertical alignment with the drawing opening and said slot, and a draw bar in the pot between the drawing opening and said slot.

3. In combination in glass drawing apparatus comprising a drawing kiln adapted to carry a body of molten glass and a sheet drawing means above the bath, a cover for the kiln having a transverse drawing opening therethrough, an upright division wall lying transversely of the kiln intermediate its ends, and extending downwardly from the cover to a point below the glass level, a horizontal division wall below the glass level extending from the upright division wall to the rear end wall of the kiln and from one side wall of the kiln to the other, and provided with a slot directly below said drawing opening, and a flange projecting upward from the horizontal division wall on each side of the slot to a point below the glass level and dividing the space above said horizontal division wall into three parallel receptacles extending from one side of the kiln to the other, the central one of which constitutes a draw pot with its center between said drawing opening and said slot in vertical alignment therewith, circulation ports being provided through the bottom walls of each of the receptacles between which the draw pot is located.

4. In combination in glass drawing apparatus comprising a drawing kiln adapted to carry a body of molten glass and a sheet drawing means above the bath, a cover for the kiln having a transverse drawing opening therethrough, an upright division wall lying transversely of the kiln intermediate its ends and extending downwardly from the cover to a point below the glass level, a horizontal division wall below the glass level extending from the upright division wall to the rear end wall of the kiln and from one side wall of the kiln to the other, and provided with a slot directly below said drawing opening, and a flange projecting upward from the horizontal division wall on each side of the slot to a point below the glass level and dividing the space above said horizontal division wall into three parallel receptacles extending from one side of the kiln to the other, the central one of which constitutes a draw pot with its center between said drawing opening and said slot in vertical alignment therewith, said horizontal division wall being cut away at its four corners to provide circulation ports between the receptacles thereabove and the body of glass in the kiln therebeneath.

5. In combination in glass drawing apparatus comprising a drawing kiln adapted to carry a body of molten glass and a sheet drawing means above the bath, a cover for the kiln having a transverse drawing opening therethrough, an upright division wall lying transversely of the kiln intermediate its ends, and extending downwardly from the cover to a point below the glass level, a horizontal division wall below the glass level extending from the upright division wall to the rear end wall of the kiln and from one side wall of the kiln to the other, and provided with a slot directly below said drawing opening, and a flange projecting upward from the horizontal division wall on each side of the slot to a point below the glass level and dividing the space above said horizontal division wall into three parallel receptacles extending from one side of the kiln to the other, the central one of which constitutes a draw pot with its center between said drawing opening and said slot in vertical alignment therewith, the bottom walls of the receptacles lying on either side of the draw pot being inclined downward from their middle portions to their ends, and ports being provided at such ends affording communication between the receptacles and the kiln therebeneath.

6. In combination in glass drawing apparatus comprising a drawing kiln adapted to carry a body of molten glass and a sheet drawing means above the bath, a cover for the kiln having a transverse drawing opening therethrough, an upright division wall lying transversely of the kiln intermediate its ends, and extending downwardly from the cover to a point below the glass level, a horizontal division wall below the glass level extending from the upright division wall to the rear end wall of the kiln and from one side wall of the kiln to the other, and provided with a slot directly below said drawing opening, a flange projecting upward from the horizontal division wall on each side of the slot to a point below the glass level, and dividing the space above said horizontal division wall into three parallel receptacles extending from one side of the kiln to the other, the central one of which constitutes a draw pot with its center in vertical alignment with the drawing opening and said slot, and means for heating the space above each of the receptacles between which the draw pot is located.

KARL G. KUTCHKA.